US010482719B2

(12) United States Patent
Adams

(10) Patent No.: US 10,482,719 B2
(45) Date of Patent: Nov. 19, 2019

(54) BACCARAT PATTERN WAGERING SYSTEM

(71) Applicant: Timothy Adams, Las Vegas, NV (US)

(72) Inventor: Timothy Adams, Las Vegas, NV (US)

( * ) Notice: Subject to any disclaimer, the term of this patent is extended or adjusted under 35 U.S.C. 154(b) by 87 days.

(21) Appl. No.: 15/965,879

(22) Filed: Apr. 28, 2018

(65) Prior Publication Data

US 2018/0322742 A1 Nov. 8, 2018

Related U.S. Application Data

(60) Provisional application No. 62/500,617, filed on May 3, 2017.

(51) Int. Cl.
*A63F 9/24* (2006.01)
*A63F 13/00* (2014.01)
*G06F 19/00* (2018.01)
*G07F 17/32* (2006.01)

(52) U.S. Cl.
CPC ...... *G07F 17/3293* (2013.01); *G07F 17/3209* (2013.01); *G07F 17/3288* (2013.01)

(58) Field of Classification Search
USPC .............................. 463/1, 11, 16, 20, 22, 25
See application file for complete search history.

(56) References Cited

U.S. PATENT DOCUMENTS

2010/0227687 A1* 9/2010 Speer, II ............ G07F 17/3211 463/31
2016/0351017 A1* 12/2016 Moore ............... G07F 17/3293
2019/0102986 A1* 4/2019 Nelson ................... G06F 3/011

* cited by examiner

*Primary Examiner* — Adetokunbo O Torimiro
(74) *Attorney, Agent, or Firm* — Mark A. Litman & Associates, P.A.

(57) ABSTRACT

A method and system host a modified game of baccarat, the modified game of baccarat comprising a player position hand and a banker position hand that are not in competition with each other in the modified game, the player position and the banker position receiving exactly two playing cards from two separate original randomized decks of 52 playing cards. The method includes detecting placement of an initial wager from one or more participants, the initial wager relating to the appearance in either or both of the player position hand and/or the banker position hand at the conclusion of initial delivery of the exactly two cards to the player position hand and the dealer position hand; and initially resolving the wager on the modified game of baccarat according to a paytable with multiples against the wager.

15 Claims, 5 Drawing Sheets

FIGURE 2A

| | | | | | | | | | |
|---|---|---|---|---|---|---|---|---|---|
| | | | | | | | | | |
| | | | | | | | | | |
| | | | | | | | | | |
| | | | | | | | | | |

FIGURE 2B

| | | | | | | | | | |
|---|---|---|---|---|---|---|---|---|---|
| P | B | P | B | P | B | | | | |
| | B | P | | P | B | | | | |
| | B | | | P | | | | | |
| | | | | P | | | | | |

FIGURE 2C

| | | | | | | | | | |
|---|---|---|---|---|---|---|---|---|---|
| B | P | B | P | T | P | B | | | |
| B | | B | P | | P | B | | | |
| | | B | | | | B | | | |
| | | | | | | B | | | |

BACCARAT PATTERN WAGERING SYSTEM

RELATED APPLICATIONS DATA

This Application claims priority from U.S. Provisional Patent Application Ser. No. 62/500,617, filed 3 May 2017 and titled "BACCARAT PATTERN WAGERING SYSTEM."

BACKGROUND OF THE INVENTION

1. Field of the Invention

The present invention relates to the field of gaming, particularly to the field of card games (both physical and electronic) and particularly to variations in the game of baccarat.

2. Background of the Art

Baccarat is one of the many live table games played in casinos or gaming establishments. Baccarat uses a standard deck of 52 playing cards and is usually dealt from a shoe having multiple decks that have been shuffled together prior to the beginning of play.

The object of the game of Baccarat is for the better to successfully wager on whether the Bank's hand or the Player's hand is going to win. The better receives even money for his wager if he selects the winning hand and loses his wager if he selects the losing hand. Because of the rules of play of Baccarat and more particularly the pre-established draw rules, the Bank's hand has a slightly higher chance of winning than does the Player's hand. The winning frequency for the Bank's hand has been determined to be 0.45859 (45.859%) whereas the winning frequency for the Player hand is 0.44624 (44.624%) with the remainder of the outcomes being ties. Therefore, if the better wagers on the Bank's hand and the Bank hand wins, the better must pay to the gaming establishment a commission (typically, 5%) of the amount the better wins. No commission is paid if the better successfully wagers on the Player's hand.

As used in this specification, the term "Conventional Manner of Play of Baccarat" is as follows:

A multiple number of decks of standard playing cards, 52 in number, are used; typically eight decks are shuffled together and placed in a shoe from which the cards are dealt during the play of the game. In an electronic system, a virtual deck (or decks) is provided and recreated with each new round of play.

Each better makes a wager on whether the Bank's hand or the Player's hand will win. After all wagers are made, two cards are dealt from the shoe to the Bank position and two cards are dealt from the shoe to the Player position on the table layout. The cards are turned face up and the value of the Bank hand the Player hand is determined, modulo ten.

Aces count one; Kings, Queens, Jacks and Tens count zero and the other cards count their respective face value. The suits (Spades, Hearts, Diamonds and Clubs) have no meaning in Baccarat.

The highest hand value in Baccarat is nine. All hand values range from a low of zero to a high of nine. If when the cards are added together, the total of the hand exceeds nine, then the hand value is determined modulo ten. For example, a seven and an eight total fifteen, but the hand value is five. An Ace and a nine total ten, but the hand value is zero.

A two card total of eight or nine is called a "natural"; a two card total of zero is called a "baccarat." As will be explained below, in certain situations in the play of the game, a third card will be dealt. The value of this third card is added to the total of the first two cards and a new hand value is established. Again, if the new hand total exceeds nine, the hand value is determined by subtracting ten from the total of the hand.

Prior to the deal, each better can make one of three wagers: 1) that the Bank hand will win; 2) that the Player hand will win; or 3) that the Bank hand and the Player hand will tie. Wagering locations are provided on the Baccarat table layout. Whichever of the Bank hand or the Player hand is closest to a total on nine is the winner.

All winning Bank hand wagers are paid off at odds of one-to-one and the house charges a five percent (5%) commission on the amount won by the better. For example, if a better wagers $100 on the Bank hand and the Bank hand wins, the better wins $100 and is charged a $5 commission on the amount that the better won. The better is not charged any commission on the amount of his wager.

All winning Player hand wagers are paid off at odds of one-to-one and the better is not charged any commission on the amount of his winnings or his wager because the house, by virtue of the third card draw rules, has a statistical advantage over the player of 45.859-44.624 or 1.235% which is the vigorish ("vig") of the house on player wagers. Winning wagers on the Tie hand bet are paid off at odds of nine-to-one or eight-to-one (depending on the gaming establishment) and the better is not charged any commission on the amount of his winnings or his wager since there is already a statistical advantage in favor of the house on tie wagers. If a Tie hand occurs, all wagers on the Bank hand and all wagers on the Player hand are "pushes" and the amount wagered is returned to the better.

Depending on the point total of the Player's hand and the Banker's hand, one more card may be dealt to either the Player's hand, the Banker's hand or both. The rules for determining whether a third card is dealt are fixed rules, there is no discretion for either the Player's hand or the Banker's hand on whether a third card is dealt.

If either the Player hand or the Banker hand has a point total of eight or nine on the first two cards, no third card is dealt to either hand and the hand with the highest point total is the winner (or the hand is a Tie, as the case may be). If neither the Player hand nor the Banker hand has a point total of eight or nine, then there is a possibility of a third card draw.

The third card draw rules are as follows:

Rule #1: If the initial two card Player hand has a point total of 0, 1, 2, 3, 4 or 5, the Player hand draws a third card. If the initial two card Player hand has a point total of 6 or 7, the Player hand stands and does not receive a third card.

Rule #2: If the Player hand stands and does not draw a third card, then the Banker hand follows Rule #1. In other words, if the Player hand has a point total of 6 or 7, the Bank hand draws a third card on a point total of 0, 1, 2, 3, 4 or 5 and the Bank hand stands on a point total of 6 or 7.

Rule #3: If the Player hand draws a third card, the Bank hand must draw or stand as follows:

TABLE 1

BACCARAT RULES

PLAYER

| HAVING TWO CARD TOTAL OF | |
|---|---|
| 1-2-3-4-5-10 | DRAWS A CARD |
| 6-7 | STANDS |
| 8-9 | TURNS CARDS OVER |

BANKER

| HAVING TWO CARD TOTAL OF | DRAWS WHEN GIVING OR PLAYER'S THIRD CARD DRAW IS AN | DOES NOT DRAW WHEN GIVING OR PLAYER'S THIRD CARD DRAW IS AN |
|---|---|---|
| 0, 1, 2 | ALWAYS DRAWS | |
| 3 | 1-2-3-4-5-6-7-9-10 | 8 |
| 4 | 2-3-4-5-6-7 | 1-8-9-10 |
| 5 | 4-5-6-7 | 1-2-3-8-9-10 |
| 6 | 6-7 | 1-2-3-4-5-8-9-10 |
| 7 | STANDS | |
| 8-9 | TURNS CARDS OVER | |

At the end of each hand, winning wagers are paid and losing wagers are collected by the house. Any commission due to the house is marked in commission boxes in the center of the table. Gaming chips are used to represent the amount of money owed by each better to the house for the commissions. In order not to slow down the game, the commission is not actually collected from each better until the end of the round determined by all of the cards in the shoe being dealt down to the plastic cut card, usually approximately eighty hands.

The mathematical analysis of the game reveals that the 5% commission is what gives the house its advantage on wagers on the Banker hand and allows the gaming establishment to make a profit from providing the Baccarat game to the betters. Because the rules for standing and drawing third cards are automatic, the mathematical analysis shows that the Bank hand will win 45.859% of the hands, the Player hand will win 44.624% of the hands and the Tie hand will occur 9.517% of the hands. If the Tie hands are disregarded because they do not affect any Player or Bank wagers, it is then determined that the Bank hand will win 50.7% of the time and the Player hand will win 49.3% of the time.

Because the Bank hand wins more than 50% of the hands (disregarding the Tie hands that do not affect any Player or Bank wagers), if a better always bet on the Bank hand, the better would have an advantage over the gaming establishment. By charging a 5% commission on all Bank hand wins, the gaming establishment compensates for the percentage of winning Bank hands being slightly over 50%.

After figuring in the 5% commission that must be paid by betters on winning Bank hands, the gaming establishment has approximately a 1.23% advantage over the better when the better wagers on the Player hand and the gaming establishment has a 1.057% advantage over the better when the better wagers on the Bank hand. The Tie hand wager gives the gaming establishment a 4.88% advantage over the better when the payoff odds are nine-to-one and a 14.1% advantage over the better when the payoff odds are eight-to-one.

One of the detriments of the conventional manner of play of Baccarat is the necessity for calculating, recording and collecting this 5% commission on all winning Bank hand wagers. Many people are reluctant to sit down and participate because they do not understand why they should have to pay a 5% commission on winning Bank hand wagers. They may consider this unfair and something extra for the gaming establishment.

The gaming establishments also suffer disadvantages from the 5% commission. The determination of the 5% amount is done visually by a casino dealer and is subject to casino dealer error and disputes with the betters over the amount of the commission. The reconciliation and collection of the commission at the end of each shoe can result in delays of the beginning of the next round of play. If a better loses all of his money ("taps out") during a round of the game, the gaming establishment may have difficulty collecting the unpaid commission that has accrued to that better during that round of the game. It has been estimated that as much as twenty percent of the accrued commission goes uncollected. Because the house margin on Baccarat is so small, uncollected commissions can seriously impact the profitability of a Baccarat table or the entire Baccarat pit, if more than one table is in play. In certain situations a better will negotiate with the casino for the casino to forgive or discount the owed commissions, the quid pro quo being that the player will likely return to the casino in the future It has been desirable to eliminate commissions in baccarat and provide different wagering events in a baccarat environment, and this has been attempted in a number of different ways.

U.S. Pat. Nos. 5,979,896 and 5,362,064 (LoFink) disclose a modified method of playing either conventional Baccarat, or a modified Baccarat game with simplified draw rules is provided which can eliminate the commission charged to winning Bank hands by providing a partial payoff on one or more Bank winning outcomes. Further the method of the present invention can operate upon the Player hand as well to adjust the vigorish therefor. The method can be used to provide a no-commission game where the vigorish for the Bank and Player hands are substantially the same. Further the vigorish can be adjusted to at least partially fund a jackpot outcome.

U.S. Pat. Nos. 6,585,586 and 6,582,302 (Romero) describes a method and gaming assembly to play a variation of the game baccarat, the gaming assembly including a computer processor assembly, a display assembly and at least one user actuatable selector assembly. The computer processor assembly is structured to generate a player's hand and a banker's hand in accordance with rules of baccarat, one of those hands being designated the user's hand. Further, the computer processor assembly is structured to determine a winning hand in accordance with the rules of baccarat, designating the user as a winner if the user's hand is also the wining hand. Additionally, the computer processor assembly is structured to monitor consecutive ones of the user's hands and to indicate a bonus payout to the user in the event that consecutive ones of the user's hands have a final number count equal to a natural nine.

SUMMARY OF THE INVENTION

A method and system of hosting a modified game of baccarat, the modified game of baccarat comprising a player position hand and a banker position hand that are not in competition with each other in the modified game, the player position and the banker position receiving exactly two playing cards from an original randomized decks of 52 playing cards. The method includes:

detecting placement of an initial wager from one or more participants, the initial wager relating to the appearance in either or both of the player position hand and/or the banker position hand at the conclusion of initial delivery of the exactly two cards to the player position hand and the dealer position hand; and initially resolving the wager on the modified game of baccarat according to a pay table with multiples against the wager.

BRIEF DESCRIPTION OF THE FIGURES

FIG. 2A shows a screen shot of a blank frame before import of or creation of pattern within the frame for the wager.

FIG. 2B shows a screen shot of a pattern created in the screen by touch and drag or template selection.

FIG. 2C shows a screen shot of a pattern created in the screen by touch and drag or template selection with a Tie (T) event included.

DETAILED DESCRIPTION OF THE INVENTION

Figure 1:
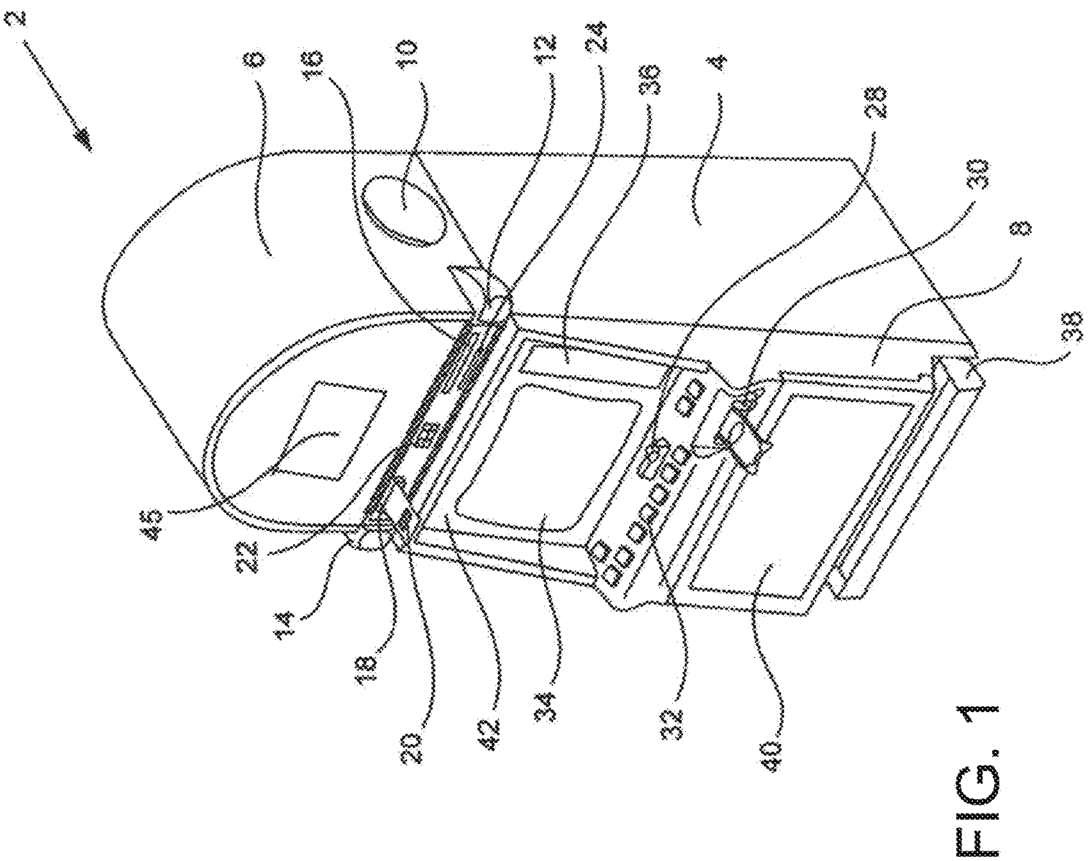
FIG. 1 shows an electronic gaming table on which the gaming method may be executed.

A method of hosting a side bet wagering event during a game of baccarat on an electronic gaming machine, electronic gaming table or blended physical playing cards with electronic card recognition/banker input and touchscreen. The electronic gaming machine may have a housing, player input control, video display including touchscreen sensitivity, processor, memory, and a value-in-value-out credit creation component selected from the group consisting of a) a ticket-in-ticket-out system having a ticket-reading scanner and ticket printer, and b) a currency validation system having a motor drive to advance currency past a scanner. The and a value-in-value-out credit creation component selected from the group consisting of a) a ticket-in-ticket-out system having a ticket-reading imager and ticket printer (a motor may drive receipt and withdrawal of tickets for reading, and the motor may drive and advance ticket stock when printed and delivered), b) a currency validation system having a motor drive to advance currency past a scanner and ejected refused currency, and c) a near field communication receiver and transmitter responsive to an external near field emitting element. The near field emitting element may be a transmitting chip or smart chip or responsive (to RF emissions from the electronic gaming system) emitting device that is user coded, such as a smart card, credit card, players card, identity card, or the like. The side bet wagering event in an underlying game of baccarat may include:

a player position committing credit through the player input controls on the side bet wagering event;

upon the processor recognizing entry of a wager at a player position on the side bet wagering event, allowing the player position to create a pattern identifying at least three expected underlying baccarat game outcomes that include both player winning outcomes and banker winning outcomes in the pattern;

the processor tracking and identifying at least three underlying baccarat game outcomes after the player position has committed credit as a wager in the side bet wagering event;

the processor resolving the side bet wager by comparing correspondence of the identified at least three expected underlying baccarat game outcomes and actual at least three underlying baccarat game outcomes and then resolving the side bet wager against a pay table identifying the correspondence and crediting winning outcomes and decrementing credit in losing outcomes.

The player enters a command through the player input controls to print a ticket from the ticket-in-ticket-out system to collect credit value stored in the memory of the electronic gaming machine. The pattern may be created by a player moving a finger in contact with the touchscreen, or by a player selecting templates of patterns stored in memory on the processor. A pattern of adjacent columns for banker winning outcomes and player winning outcomes is provided on the touchscreen. The player contacts the screen within the screen, and a blank pattern array may be provided, to create a pattern and drags horizontally to switch between player winning outcomes and banker winning outcomes, and up or down to alter numbers of player winning outcomes and banker winning outcomes within the pattern created by the player.

The method may be effected where occurrence of a tie outcome immediately ends further comparing or correspondence within a pattern, wherein occurrence of a tie outcome is ignored in further comparing or correspondence within a pattern, or wherein occurrence of a tie is included in the creation of a pattern.

At least some odds in the pay 1 table provide odds that are higher than statistical probabilities for the pattern. That is, the actual probability for predicting four consecutive events would be 1:8 (not including ties), and odds may be provided for at least one four event outcome could be ≥1 when ties are included in possible tracked events.

The present invention also includes an electronic gaming machine including a housing, player input control, video display including touchscreen sensitivity, processor, memory, and a value-in-value-out credit creation component selected from the group consisting of a) a ticket-in-ticket-out system having a ticket-reading scanner and ticket printer, and b) a currency validation system having a motor drive to advance currency past a scanner, wherein the processor is configured to execute software to execute a process on the electronic gaming machine of:

a player position committing credit through the player input controls on the side bet wagering event;

upon the processor recognizing entry of a wager at a player position on the side bet wagering event, allowing the player position to create a pattern identifying at least three expected underlying baccarat game outcomes that include both player winning outcomes and banker winning outcomes in the pattern;

the processor tracking the actual at least three underlying baccarat game outcomes after the player position has committed credit as a wager in the side bet wagering event;

the processor resolving the side bet wager by comparing correspondence of the identified at least three expected underlying baccarat game outcomes and actual at least three underlying baccarat game outcomes and then resolving the side bet wager against a pay table identifying the correspondence and crediting winning outcomes and decrementing credit in losing outcomes.

Another method according to the present invention may include executing a side bet wagering event during a wagering event of baccarat on a gaming table including a playing surface on the gaming table, a processor, bet recognition system for determining presence and amount of wagers at a player position for the side bet, a playing card reading system that identifies at least value of playing cards during execution of play of the wagering event of baccarat, a player control panel including touchscreen functionality that communicates player input data to the processor, and a video display which indicates an ordered history of baccarat outcomes, wherein the side bet wagering event is executed against at least three consecutive outcomes occurring in an underlying game of baccarat comprising:

a player position commits credit to the side bet wager that is recognized by the bet recognition system;

upon the processor recognizing commitment of a wager at a player position on the side bet wagering event, allowing the player position to create on the player control panel a pattern identifying at least three expected underlying baccarat game outcomes that include both player winning outcomes and banker winning outcomes in the pattern;

the processor tracking the actual at least three underlying baccarat game outcomes after the player position has committed credit as a wager in the side bet wagering event;

the processor or a live dealer resolving the side bet wager by comparing correspondence of the identified at least three expected underlying baccarat game outcomes and actual at least three underlying baccarat game outcomes and then resolving the side bet wager against a pay table identifying levels of the correspondence and crediting winning outcomes and decrementing credit in losing outcomes.

The system may use one or more sources of original randomized decks of 52 playing cards. The sources may be, by way of non-limiting examples, pre-shuffled sets or compartments of cards, randomized sets of cards in a dealer shoe, and electromechanical randomizing sources of individual playing cards of groups of two playing cards.

The system may include the separate original randomized decks of 52 playing cards as two separate caches in memory of virtual playing cards, each cache comprising a randomized standard 52-card virtual playing card deck.

FIG. 2A shows a screen shot of a blank frame before import of or creation of pattern within the frame for the wager.

FIG. 2B shows a screen shot of a pattern created in the screen by touch and drag or template selection. The pattern would have been created by touching and dragging through (row by row) one column in the first row, three columns in the second row, two columns in the third row, one column in the fourth row, etc. An initial outcome entry (e.g., Player or Banker win) can be established by either a button entry (not shown) on the machine or touchscreen, or repeatedly tapping the touchscreen until the initial choice is shown. Each adjacent row must be different, or the pattern would be only the same outcome. More rows may of course be available, with four rows shown as a convenience in the Figures.

FIG. 2C shows a screen shot of a pattern created in the screen by touch and drag or template selection with a Tie (T) event included. The Tie event may be in a template selected or created by a panel button (not shown) or additional taps (e.g., one tap is Player, two taps are Banker and three taps are Tie events).

These and other variations may be provided in the practice of the present invention.

Computer-Based Implementations

Methods of the present invention may be implemented in computer hardware, software, or computer hardware and software. A most common form of computer implementation is a stand-alone, single player electronic gaming machine with electronic player controls and one or more video output screens.

In computer-based embodiments, the gaming device preferably includes at least one processor, such as a microprocessor, a microcontroller-based platform, a suitable integrated circuit or one or more application-specific integrated circuits (ASIC's) or Field Programmable Gated Arrays (FPGA's). The processor is in communication with or operable to access or to exchange signals with at least one data storage or memory device, and/or a player monitor or monitors. In one embodiment, the processor and the memory device reside within the cabinet of a gaming device. Multiple gaming devices are typically connected to a casino information network.

The memory device stores program code and instructions, executable by the processor, to control the gaming device. The memory device also stores other data such as image data, event data, player input data, random or pseudo-random number generators, pay-table data or information, House Ways distributions and applicable game rules that relate to the play of the gaming device. In one embodiment, the memory device includes random access memory (RAM): which can include non-volatile RAM (NVRAM): magnetic RAM (MRAM), ferroelectric RAM (FeRAM), and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical, and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD, or USB memory device.

In other embodiments, part or all of the program code and/or operating data described above can be downloaded to the memory device through a suitable network. In one embodiment, an operator or a player can use such a removable memory device in a desktop computer, a laptop computer, a personal digital assistant (PDA), a portable computing device, or another computerized platform to implement the present disclosure. In one embodiment, the gaming device or gaming machine disclosed herein is operable over a wireless network, for example part of a wireless gaming system. The gaming machine may be a hand-held device, a mobile device, or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "processor" or "computer" or "controller" or "game controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator, or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome. It is also possible for templates or weighted templates of sets of tiles or paylines as disclosed in U.S. Pat. Nos. 6,159,096 and 6,117,009 (Yoseloff, which are incorporated by reference in their entirety) which disclose a method of configuring a video output gaming device to randomly generate game outcomes. The method includes the steps of selecting a set of game symbols, assigning a probability of occurrence to each symbol, selecting a plurality of outcome templates, each template comprising X variables, selecting a probability of occurrence for each outcome template, assigning a subset of symbols from the set of game symbols to each template for filling the positions, defining payouts for selected outcomes, and configuring a video output gaming device, which randomly selects a template, randomly selects a symbol for each variable in the template from the subset of game symbols assigned to the selected template, randomly fills at least a portion of the positions in the template and displays the outcome on a video output display. A video output gaming device programmed to randomly select a template, randomly select symbols to define the variables and randomly display the selected symbols is also disclosed.

In one embodiment, described in more detail below as a "chipless gaming platform", the gaming device includes one or more display devices that are mounted into a gaming table surface and are controlled by the processor in addition to or separately from the individual player monitors. The display devices are preferably connected to or mounted into the table structure. This may include a central display device which displays a primary game, dealer images, jackpot information, or information that is not specifically related to the game, such as sports information or winning events at other tables. This display device may also display any suitable secondary game associated with the primary game as well as information relating to the primary or secondary game (e.g., side bets, bonuses, jackpots and the like).

An alternative embodiment may include a central horizontal game display device and a vertically oriented virtual dealer display device as in Shuffle Master, Inc.'s Table Master™ gaming system. The central display device may display the primary game, any suitable secondary game associated or not associated with the primary game and/or information relating to the primary or secondary game. These display devices may also serve as digital glass operable to advertise games or other aspects of the gaming establishment. The gaming device includes a credit display 20 which displays a player's current number of credits, cash, account balance, or the equivalent. In one embodiment, the gaming device includes a bet display displays a player's amount wagered. In one embodiment, as described in more detail below, the gaming device includes a player tracking display which displays information regarding a player's play tracking status.

In yet another embodiment, at least one display device may be a mobile display device, such as a PDA or tablet PC that enables play of at least a portion of the primary or secondary game at a location remote from the gaming device. The display devices may include, without limitation, a monitor, a television display, a plasma display, a liquid crystal display (LCD) a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism.

In one embodiment, as described in more detail below, the display device includes a touch-screen with an associated touch-screen controller. The display devices may be of any suitable size and configuration, such as a square, a rectangle or an elongated rectangle. The display devices of the gaming device are configured to display at least one and preferably a plurality of game or other suitable images, symbols and indicia such as any visual representation or exhibition of the movement of objects such as mechanical, virtual, or video reels and wheels, dynamic lighting, video images, images of people, characters, places, things, faces of cards, images of dealers and the like.

Other forms of the invention are in the form of game software that is implemented in a variety of formats, such as internet gaming, PC practice play, hand-held game devices, wireless gaming devices and the like.

Chipless Gaming Table Implementation

One enabling system useful in the practice of the present invention is the use of playing cards with Chinese domino symbols which can be distributed for use with a system marketed under the name i-TABLE™ by Shuffle Master, Inc. of Las Vegas, Nev. That system includes: a) a physical gaming table; b) player monitors at each player position; c) a playing card reading and delivery system (e.g., commercially available shufflers and playing card delivery shoes with reading capability as sold under the Trade names of One2Six™ shuffler, Ace™ shuffler, I-DEAL™ shuffler, I-SHOE™ delivery shoe, etc.); d) a processor receiving information (numbers of cards, rank of cards, suits of cards, etc.) from the card reading and delivery systems; e) communication connectivity (hardwired or wireless) between necessary combinations of the card reading/delivery systems and the processor, the processor and the individual player monitors, and/or the card reading/delivery systems and the video monitors; and f) software in the processor that defines predetermined advantage for distributions of playing cards into multiple hands, game rules, hand history, and the like. In order to prevent a bet pattern exceeding the number of possible hands in a "live" shoe, a card count will be tracked and the remaining cards will be continually divided by six (the maximum number of cards for a hand).

With regard to software f), it is understood in the practice of the present technology that this is not complex software that reads individual player hand cards and determines advantageous card distributions for a first time by extensive calculations. Rather, the entire range of possibilities of hands (e.g., all possible five card sets dealt to players in poker-style games) is known in poker style games.

A preferable card handling device for administering a video reel-type-style game is a hand-forming shuffler with integrated card recognition technology, from which playing cards are supplied, with a least a rank/count (and preferable also suit) of individual packs of cards are known before the cards are removed and delivered to player positions and/or the banker position. The card delivery system 102 is in communication with the controller 128 by wired or wireless communication methods. Communication between the various system components is not limited to electronic or electrical signals, but may include optical signals, audio signals, magnetic transmission or the like.

The individual player position processors (not shown) are preferable graphics processors and not full content CPUs as a cost saving, space saving, and efficiency benefit. With the reduced capacity in the processor as compared to a CPU, there is actually reduced likelihood of tampering and fraudulent input.

Turning next to FIG. 1, a video gaming machine 2 of the present invention is shown. Machine 2 includes a main cabinet 4, which generally surrounds the machine interior (not shown) and is viewable by users. The main cabinet includes a main door 8 on the front of the machine, which opens to provide access to the interior of the machine. Attached to the main door are player-input switches or buttons 32, a coin acceptor 28, and a bill validator 30, a coin tray 38, and a display area including a mechanical gaming system (or less preferably a separate electronic game) 40. There may be an overlay of touchscreen functionality on the separate electronic game 40 or some of the buttons 32 may be functional on the separate mechanical gaming system 40. That separate mechanical gaming system may be in a relatively vertical viewing position as shown, or in a more horizontal (table like) display unit. Viewable through the main door is a video display monitor 34 and an information panel 36. The display monitor 34 will typically be a cathode ray tube, high resolution flat-panel LCD, LED, plasma screen or other conventional electronically controlled video monitor. The information panel 36 may be a back-lit, silk screened glass panel with lettering to indicate general game information including, for example, a game denomination (e.g. $0.25 or $1). The bill validator 30, player-input switches 32, video display monitor 34, and information panel are devices used to play a game on the game machine 2. The devices are controlled by circuitry (e.g. the master gaming controller) housed inside the main cabinet 4 of the machine 2.

Many different types of games, including mechanical slot games, video slot games, video poker, video blackjack, video pachinko and lottery, may be provided with gaming machines of this invention. In particular, the gaming machine 2 may be operable to provide a play of many different instances of games of chance. The instances may be differentiated according to themes, sounds, graphics, type of game (e.g., slot game vs. card game), denomination, number of paylines, maximum jackpot, progressive or non-progressive, bonus games, etc. The gaming machine 2 may be operable to allow a player to select a game of chance to play from a plurality of instances available on the gaming machine. For example, the gaming machine may provide a menu with a list of the instances of games that are available for play on the gaming machine and a player may be able to select from the list a first instance of a game of chance that they wish to play.

The various instances of games available for play on the gaming machine 2 may be stored as game software on a mass storage device in the gaming machine or may be generated on a remote gaming device but then displayed on the gaming machine. The gaming machine 2 may executed game software, such as but not limited to video streaming software that allows the game to be displayed on the gaming machine. When an instance is stored on the gaming machine 2, it may be loaded from the mass storage device into a RAM for execution. In some cases, after a selection of an instance, the game software that allows the selected instance to be generated may be downloaded from a remote gaming device, such as another gaming machine.

The gaming machine 2 includes a top box 6, which sits on top of the main cabinet 4. The top box 6 houses a number of devices, which may be used to add features to a game being played on the gaming machine 2, including speakers 10, 12, 14, a ticket printer 18 which prints bar-coded tickets 20, a key pad 22 for entering player tracking information, a florescent display 16 for displaying plays tracking information, a card reader 24 for entering a magnetic striped card containing player tracking information, and a video display screen 42. The ticket printer 18 may be used to print tickets for a cashless ticketing system. Further, the top box 6 may house different or additional devices than shown in the FIG. 1. For example, the top box may contain a bonus wheel or a back-lit silk screened panel which may be used to add bonus features to the game being played on the gaming machine. As another example, the top box may contain a display for a progressive jackpot offered on the gaming machine. During a game, these devices are controlled and powered, in part, by circuitry (e.g. a master gaming controller) housed within the main cabinet 4 of the machine 2.

Understand that gaming machine 2 is but one example from a wide range of gaming machine designs on which the present invention may be implemented. For example, not all suitable gaming machines have top boxes or player tracking features. Further, some gaming machines have only a single game display—mechanical or video, while others are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Images rendered from 3-D gaming environments may be displayed on portable gaming devices that are used to play a game of chance. Further a gaming machine or server may include gaming logic for commanding a remote gaming device to render an image from a virtual camera in a 3-D gaming environments stored on the remote gaming device and to display the rendered image on a display located on the remote gaming device. Thus, those of skill in the art will understand that the present invention, as described below, can be deployed on most any gaming machine now available or hereafter developed.

Some preferred gaming machines are implemented with special features and/or additional circuitry that differentiates them from general-purpose computers (e.g., desktop PC's and laptops). Gaming machines are highly regulated to ensure fairness and, in many cases, gaming machines are operable to dispense monetary awards of multiple millions of dollars. Therefore, to satisfy security and regulatory requirements in a gaming environment, hardware and software architectures may be implemented in gaming machines that differ significantly from those of general-purpose computers. A description of gaming machines relative to general-purpose computing machines and some examples of the additional (or different) components and features found in gaming machines are described below.

At first glance, one might think that adapting PC technologies to the gaming industry would be a simple proposition because both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

For the purposes of illustration, a few differences between PC systems and gaming systems will be described. A first difference between gaming machines and common PC based computers systems is that gaming machines are designed to be state-based systems. In a state-based system, the system stores and maintains its current state in a non-volatile memory, such that, in the event of a power failure or other malfunction the gaming machine will return to its current state when the power is restored. For instance, if a player was shown an award for a game of chance and, before the award could be provided to the player the power failed, the gaming machine, upon the restoration of power, would return to the state where the award is indicated. As anyone who has used a PC, knows, PCs are not state machines and a majority of data is usually lost when a malfunction occurs. This requirement affects the software and hardware design on a gaming machine.

A second important difference between gaming machines and common PC based computer systems is that for regulation purposes, the software on the gaming machine used to generate the game of chance and operate the gaming machine has been designed to be static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of volatile memory. The coding instructions on the EPROM are static (non-changeable) and must be approved by a gaining regulators in a particular jurisdiction and installed in the presence of a person representing the gaming jurisdiction. Any changes to any part of the software required to generate the game of chance, such as adding a new device driver used by the master gaming controller to operate a device during generation of the game of chance can require a new EPROM to be burnt, approved by the gaming jurisdiction and reinstalled on the gaming machine in the presence of a gaming regulator. Regardless of whether the EPROM solution is used, to gain approval in most gaming jurisdictions, a gaming machine must demonstrate sufficient safeguards that prevent an operator or player of a gaming machine from manipulating hardware and software in a manner that gives them an unfair and some cases an illegal advantage. The gaming machine should have a means to determine if the code it will execute is valid. If the code is not valid, the gaming machine must have a means to prevent the code from being executed. The code validation requirements in the gaming industry affect both hardware and software designs on gaming machines.

A third important difference between gaming machines and common PC based computer systems is the number and kinds of peripheral devices used on a gaming machine are not as great as on PC based computer systems. Traditionally, in the gaming industry, gaming machines have been relatively simple in the sense that the number of peripheral devices and the number of functions the gaming machine has been limited. Further, in operation, the functionality of gaming machines were relatively constant once the gaming machine was deployed, i.e., new peripherals devices and new gaming software were infrequently added to the gaming machine. This differs from a PC where users will go out and buy different combinations of devices and software from different manufacturers and connect them to a PC to suit their needs depending on a desired application. Therefore, the types of devices connected to a PC may vary greatly from user to user depending in their individual requirements and may vary significantly over time.

Although the variety of devices available for a PC may be greater than on a gaming machine, gaming machines still have unique device requirements that differ from a PC, such as device security requirements not usually addressed by PCs. For instance, monetary devices, such as coin dispensers, bill validators and ticket printers and computing devices that are used to govern the input and output of cash to a gaming machine have security requirements that are not typically addressed in PCs. Therefore, many PC techniques and methods developed to facilitate device connectivity and device compatibility do not address the emphasis placed on security in the gaming industry.

To address some of the issues described above, a number of hardware/software components and architectures are utilized in gaming machines that are not typically found in general purpose computing devices, such as PCs. These hardware/software components and architectures, as described below in more detail, include but are not limited to watchdog timers, voltage monitoring systems, state-based software architecture and supporting hardware, specialized communication interfaces, security monitoring and trusted memory.

A watchdog timer is normally used in gaming machines to provide a software failure detection mechanism. In a normally operating system, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits contain a loadable timeout counter register to allow the operating software to set the timeout interval within a certain range of time. A differentiating feature of the some preferred circuits is that the operating software cannot completely disable the function of the watchdog timer. In other words, the watchdog timer always functions from the time power is applied to the board.

Gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modem general-purpose computers include voltage monitoring circuitry, these types of circuits only report voltage status to the operating software. Out of tolerance voltages can cause software malfunction, creating a potential uncontrolled condition in the gaming computer. Gaming machines typically have power supplies with tighter voltage margins than that required by the operating circuitry. In addition, the voltage monitoring circuitry implemented in gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for slot machine game software is to use a state machine. Different functions of the game (bet, play, result, points in the graphical presentation, etc.) may be defined as a state. When a game moves from one state to another, critical data regarding the game software is stored in a custom non-volatile memory subsystem. This is critical to ensure the player's wager and credits are preserved and to minimize potential disputes in the event of a malfunction on the gaming machine.

In general, the gaming machine does not advance from a first state to a second state until critical information that allows the first state to be reconstructed is stored. This feature allows the game to recover operation to the current state of play in the event of a malfunction, loss of power, etc. that occurred just prior to the malfunction. After the state of the gaming machine is restored during the play of a game of chance, game play may resume and the game may be completed in a manner that is no different than if the malfunction had not occurred. Typically, battery backed RAM devices are used to preserve this critical data although other types of non-volatile memory devices may be employed. These memory devices are not used in typical general-purpose computers.

As described in the preceding paragraph, when a malfunction occurs during a game of chance, the gaming machine may be restored to a state in the game of chance just prior to when the malfunction occurred. The restored state may include metering information and graphical information that was displayed on the gaming machine in the state prior to the malfunction. For example, when the malfunction occurs during the play of a card game after the cards have been dealt, the gaming machine may be restored with the cards that were previously displayed as part of the card game. As another example, a bonus game may be triggered during the play of a game of chance where a player is required to make a number of selections on a video display screen. When a malfunction has occurred after the player has made one or more selections, the gaming machine may be restored to a state that shows the graphical presentation at the just prior to the malfunction including an indication of selections that have already been made by the player. In general, the gaming machine may be restored to any state in a plurality of states that occur in the game of chance that occurs while the game of chance is played or to states that occur between the play of a game of chance.

Game history information regarding previous games played such as an amount wagered, the outcome of the game and so forth may also be stored in a non-volatile memory device. The information stored in the non-volatile memory may be detailed enough to reconstruct a portion of the graphical presentation that was previously presented on the gaming machine and the state of the gaming machine (e.g., credits) at the time the game of chance was played. The game history information may be utilized in the event of a dispute. For example, a player may decide that in a previous game of chance that they did not receive credit for an award that they believed they won. The game history information may be used to reconstruct the state of the gaming machine prior, during and/or after the disputed game to demonstrate whether the player was correct or not in their assertion.

Another feature of gaming machines, such as gaming computers, is that they often contain unique interfaces, including serial interfaces, to connect to specific subsystems internal and external to the slot machine. The serial devices may have electrical interface requirements that differ from the "standard" EIA 232 serial interfaces provided by general-purpose computers. These interfaces may include EIA 485, EIA 422, Fiber Optic Serial, optically coupled serial interfaces, current loop style serial interfaces, etc. In addition, to conserve serial interfaces internally in the slot machine, serial devices may be connected in a shared, daisy-chain fashion, where multiple peripheral devices are connected to a single serial channel.

The serial interfaces may be used to transmit information using communication protocols that are unique to the gaming industry. For example, the Netplex™ system of IGT is a proprietary communication protocol used for serial communication between gaming devices. As another example, SAS is a communication protocol used to transmit information, such as metering information, from a gaming machine to a remote device. Often SAS is used in conjunction with a player tracking system.

Gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this.

Security monitoring circuits detect intrusion into a gaming machine by monitoring security switches attached to access doors in the slot machine cabinet. Preferably, access violations result in suspension of game play and can trigger additional security operations to preserve the current state of game play. These circuits also function when power is off by use of a battery backup. In power-off operation, these circuits continue to monitor the access doors of the slot machine. When power is restored, the gaming machine can determine whether any security violations occurred while power was off, e.g., via software for reading status registers. This can trigger event log entries and further data authentication operations by the slot machine software.

Trusted memory devices are preferably included in a gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the slot machine. The code and data stored in these devices may include authentication algorithms, random number generators, authentication keys, operating system kernels, etc. The purpose of these trusted memory devices is to provide gaming regulatory authorities a root trusted authority within the computing environment of the slot machine that can be tracked and verified as original. This may be accomplished via removal of the trusted memory device from the slot machine computer and verification of the secure memory device contents is a separate third party verification device. Once the trusted memory device is verified as authentic, and based on the approval of the verification algorithms contained in the trusted device, the gaming machine is allowed to verify the authenticity of additional code and data that may he located in the gaming computer assembly, such as code and data stored on hard disk drives. A few details related to trusted memory devices that may be used in the present invention are described in U.S. Pat. No. 6,685,567 titled “Process Verification,” which is incorporated herein in its entirety and for all purposes.

Mass storage devices used in a general purpose computer typically allow code and data to he read from and written to the mass storage device. In a gaming machine environment, modification of the gaming code stored on a mass storage device is strictly controlled and would only be allowed under specific maintenance type events with electronic and physical enablers required. Though this level of security could be provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

Returning to the example of FIG. 1, when a user wishes to play the gaming machine 2, he or she inserts cash through the coin acceptor 28 or bill validator 30. Additionally, the bill validator may accept a printed ticket voucher which may be accepted by the bill validator 30 as an indicia of credit when a cashless ticketing system is used. At the start of the game, the player may enter playing tracking information using the card reader 24, the keypad 22, and the florescent display 16. Further, other game preferences of the player playing the game may be read from a card inserted into the card reader. During the game, the player views game information using the video display 34. Other game and prize information may also be displayed in the video display screen 42 located in the top box.

During the course of a game, a player may be required to make a number of decisions, which affect the outcome of the game. For example, a player may vary his or her wager on a particular game, select a prize for a particular game selected from a prize server, or make game decisions which affect the outcome of a particular game. The player may make these choices using the player-input switches 32, the video display screen 34 or using some other device which enables a player to input information into the gaming machine. In some embodiments, the player may be able to access various game services such as concierge services and entertainment content services using the video display screen 34 and one more input devices.

During certain game events, the gaming machine 2 may display visual and auditory effects that can be perceived by the player. These effects add to the excitement of a game, which makes a player more likely to continue playing. Auditory effects include various sounds that are projected by the speakers 10, 12, 14. Visual effects include flashing lights, strobing lights or other patterns displayed from lights on the gaming machine 2 or from lights within the separate mechanical (or electronic) separately, individually wagerable gaming system 40. After the player has completed a game, the player may receive game tokens front the coin tray 38 or the ticket 20 from the printer 18, which may be used for further games or to redeem a prize. Further, the player may receive a ticket 20 for food, merchandise, or games from the printer 18.

Figure 1A:
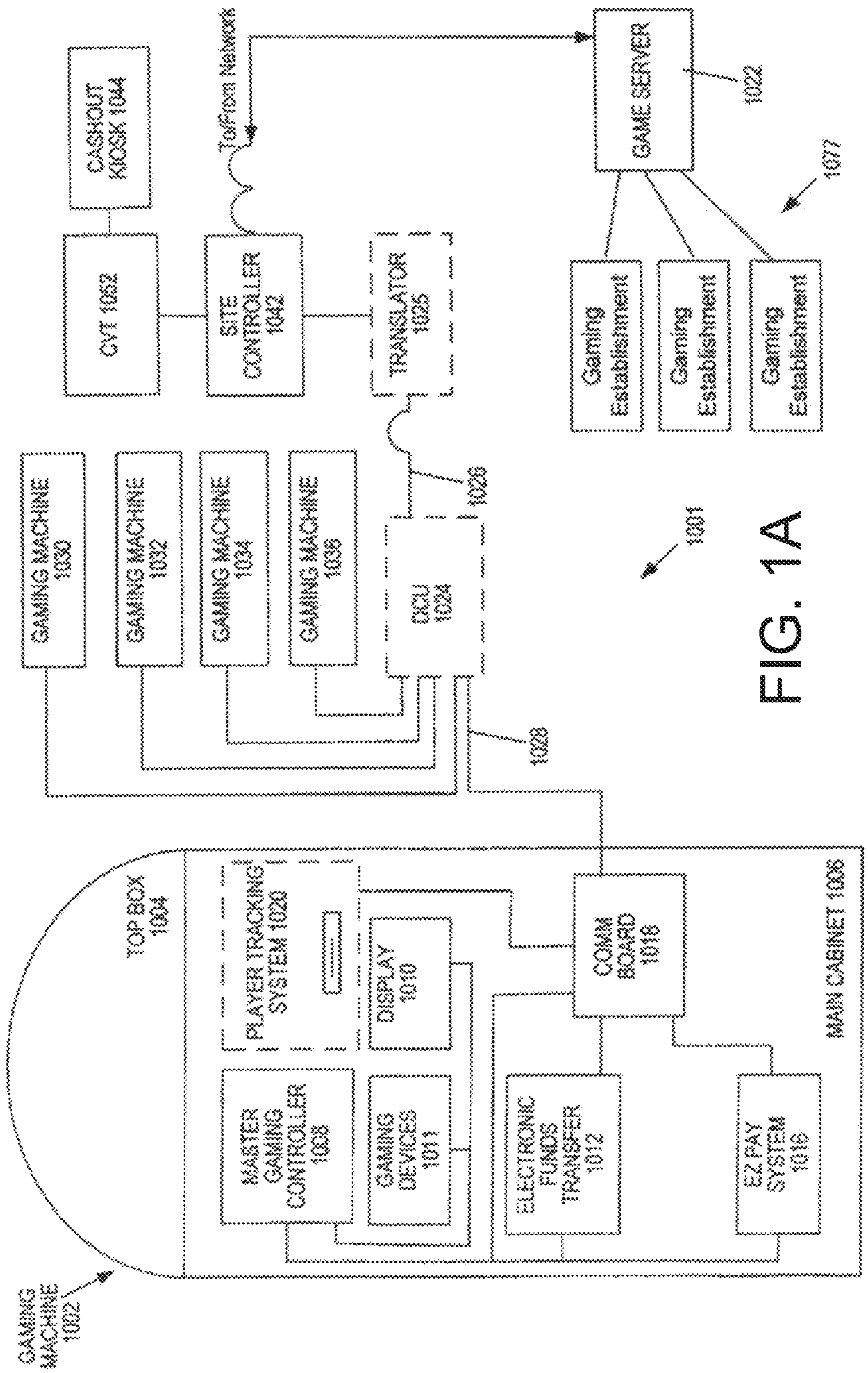
FIG. 1A shows a schematic for an electronic system for enabling play of the gaming method described herein.

Another gaming network that may be used to implement some aspects of the invention is depicted in FIG. 1A. Gaming establishment 1001 could be any sort of gaming establishment, such as a casino, a card room, an airport, a store, etc. In this example, gaming network 1077 includes more than one gaming establishment, all of which are networked to game server 1022. Here, gaming machine 1002, and the other gaming machines 1030, 1032, 1034, and 1036, include a main cabinet 1006 and a top box 1004. The main cabinet 1006 houses the main gaming elements and can also house peripheral systems, such as those that utilize dedicated gaming networks. The top box 1004 may also be used to house these peripheral systems.

The master gaming controller 1008 controls the game play on the gaming machine 1002 according to instructions and/or game data from game server 1022 or stored within gaming machine 1002 and receives or sends data to various input/output devices 1011 on the gaming machine 1002. In one embodiment, master gaming controller 1008 includes processor(s) and other apparatus of the gaming machines described above. The master gaming controller 1008 may also communicate with a display 1010.

A particular gaming entity may desire to provide network gaming services that provide some operational advantage. Thus, dedicated networks may connect gaming machines to host servers that track the performance of gaming machines under the control of the entity, such as for accounting management, electronic fund transfers (EFTs), cashless ticketing, such as EZPay™, marketing management, and data tracking, such as player tracking. Therefore, master gaming controller 1008 may also communicate with EFT system 1012, EZPay™ system, and player tracking system 1020. The systems of the gaming machine 1002 communicate the data onto the network 1022 via a communication board 1018.

It will be appreciated by those of skill in the art that embodiments of the present invention could be implemented on a network with more or fewer elements than are depicted in FIG. 1A. For example, player tracking system 1020 is not a necessary feature of some implementations of the present invention. However, player tracking programs may help to sustain a game player’s interest in additional game play during a visit to a gaming establishment and may entice a player to visit a gaming establishment to partake in various gaming activities. Player tracking programs provide rewards to players that typically correspond to the player’s level of patronage (e.g., to the player’s playing frequency and/or total amount of game plays at a given casino). Player tracking rewards may be free meals, free lodging and/or free entertainment. Player tracking information may be combined with other information that is now readily obtainable by an SBG system.

Moreover, DCU 1024 and translator 1025 are not required for all gaming establishments 1001. However, due to the sensitive nature of much of the information on a gaming network (e.g., electronic fund transfers and player tracking data) the manufacturer of a host system usually employs a particular networking language having proprietary protocols. For instance, 10-20 different companies produce player tracking host systems where each host system may use different protocols. These proprietary protocols are usually considered highly confidential and not released publicly.

Further, gaming machines are made by many different manufacturers. The communication protocols on the gaming machine are typically hard-wired into the gaming machine and each gaming machine manufacturer may utilize a different proprietary communication protocol. A gaming machine manufacturer may also produce host systems, in which case their gaming machines are compatible with their own host systems. However, in a heterogeneous gaming environment, gaming machines from different manufacturers, each with its own communication protocol, may be connected to host systems from other manufacturers, each with another communication protocol. Therefore, communication compatibility issues regarding the protocols used by the gaming machines in the system and protocols used by the host systems must be considered.

A network device that links a gaming establishment with another gaming establishment and/or a central system will sometimes be referred to herein as a "site controller." Here, site controller 1042 provides this function for gaming establishment 1001. Site controller 1042 is connected to a central system and/or other gaming establishments via one or more networks, which may be public or private networks. Among other things, site controller 1042 communicates with game server 1022 to obtain game data, such as ball drop data, bingo card data, etc.

In the present illustration, gaming machines 1002, 1030, 1032, 1034 and 1036 are connected to a dedicated gaming network 1022. In general, the DCU 1024 functions as an intermediary between the different gaming machines on the network 1022 and the site controller 1042. In general, the DCU 1024 receives data transmitted from the gaming machines and sends the data to the site controller 1042 over a transmission path 1026. In some instances, when the hardware interface used by the gaming machine is not compatible with site controller 1042, a translator 1025 may be used to convert serial data from the DCU 1024 to a format accepted by site controller 1042. The translator may provide this conversion service to a plurality of DCUs.

Further, in some dedicated gaming networks, the DCU 1024 can receive data transmitted from site controller 1042 for communication to the gaming machines on the gaming network. The received data may be, for example, communicated synchronously to the gaming machines on the gaming network.

Here, CVT 1052 provides cashless and cashout gaming services to the gaming machines in gaming establishment 1001. Broadly speaking, CVT 1052 authorizes and validates cashless gaming machine instruments (also referred to herein as "tickets" or "vouchers"), including but not limited to tickets for causing a gaming machine to display a game result and cash-out tickets. Moreover, CVT 1052 authorizes the exchange of a cashout ticket for cash. These processes will be described in detail below. In one example, when a player attempts to redeem a cash-out ticket for cash at cashout kiosk 1044, cash out kiosk 1044 reads validation data from the cashout ticket and transmits the validation data to CVT 1052 for validation. The tickets may be printed by gaming machines, by cashout kiosk 1044, by a stand-alone printer, by CVT 1052, etc. Some gaming establishments will not have a cashout kiosk 1044. Instead, a cashout ticket could be redeemed for cash by a cashier (e.g. of a convenience store), by a gaming machine or by a specially configured CVT.

Figure 1B:
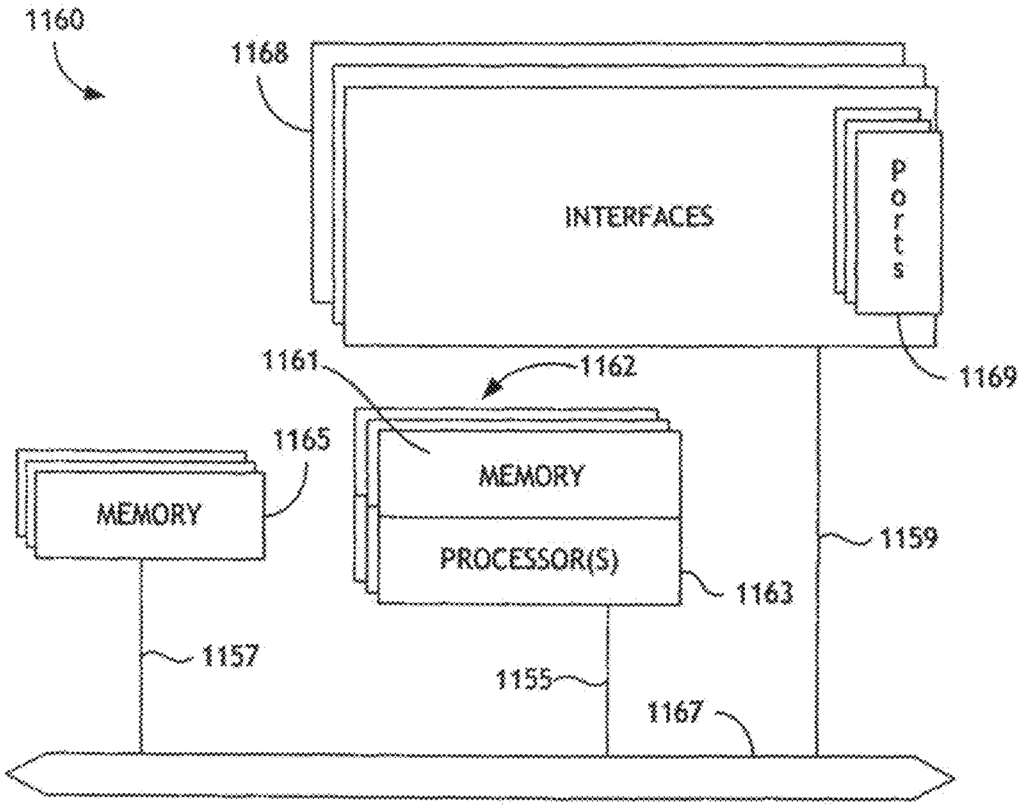
FIG. 1B shows another schematic for an electronic system for enabling play of the gaming method described herein.
Figure 3:
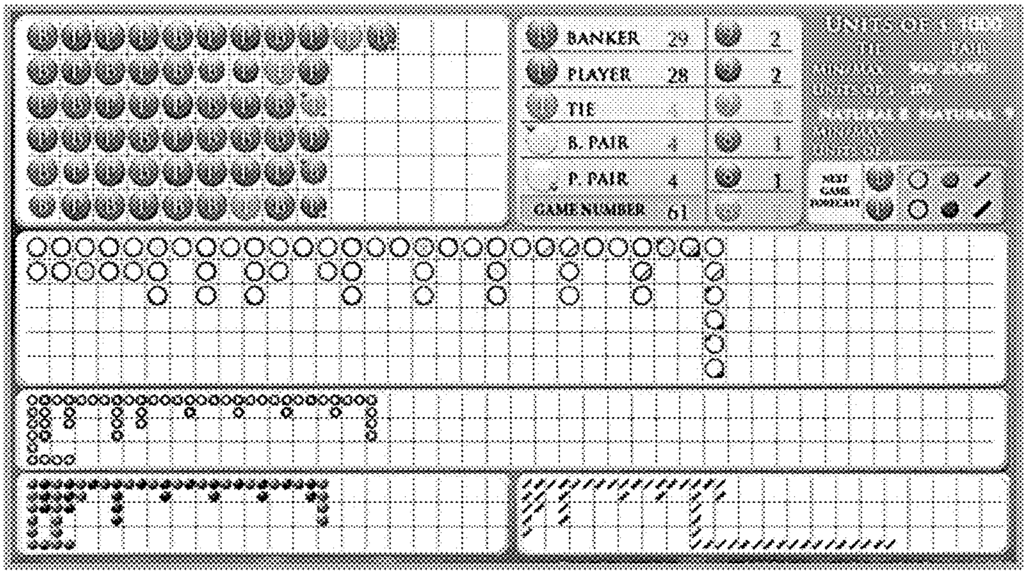
FIG. 3 shows a screen shot of a complete pattern display and paytable.

FIG. 1B illustrates an example of a network device that may be configured for implementing some methods of the present invention. Network device 1160 includes a master central processing unit (CPU) 1162, interfaces 1168, and a bus 1167 (e.g., a PCI bus). Generally, interfaces 1168 include ports 1169 appropriate for communication with the appropriate media. In some embodiments, one or more of interfaces 1168 includes at least one independent processor and, in some instances, volatile RAM. The independent processors may be, for example, ASICs or any other appropriate processors. According to some such embodiments, these independent processors perform at least some of the functions of the logic described herein. In some embodiments, one or more of interfaces 1168 control such communications-intensive tasks as encryption, decryption, compression, decompression, packetization, media control and management. By providing separate processors for the communications-intensive tasks, interfaces 1168 allow the master microprocessor 1162 efficiently to perform other functions such as routing computations, network diagnostics, security functions, etc.

The interfaces 1168 are typically provided as interface cards (sometimes referred to as "linecards"). Generally, interfaces 1168 control the sending and receiving of data packets over the network and sometimes support other peripherals used with the network device 1160. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 1162 may be responsible for implementing specific functions associated with the functions of a desired network device. According to some embodiments, CPU 1162 accomplishes all these functions under the control of software including an operating system and any appropriate applications software.

CPU 1162 may include one or more processors 1163 such as a processor from the Motorola family of microprocessors or the MIPS family of microprocessors. In an alternative embodiment, processor 1163 is specially designed hardware for controlling the operations of network device 1160. In a specific embodiment, a memory 1161 (such as non-volatile RAM and/or ROM) also forms part of CPU 1162. However, there are many different ways in which memory could be coupled to the system. Memory block 1161 may be used for a variety of purposes such as, for example, caching and/or storing data, programming instructions, etc.

Regardless of network device's configuration, it may employ one or more memories or memory modules (such as, for example, memory block 1165) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention also relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher-level code that may be executed by the computer using an interpreter.

Although the system shown in FIG. 1B illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces may be bus based (as shown in FIG. 1B) or switch fabric based (such as a cross-bar).

While this invention is described in terms of preferred embodiments, there are alterations, permutations, and equivalents that fall within the scope of the invention. It should also be noted that there are many alternative ways of implementing the present invention. It is therefore intended that the invention not be limited to the preferred embodiments described herein, but instead that the invention should be interpreted as including all such alterations, permutations, and equivalents as fall within the true spirit and scope of the present invention.

What is claimed:

1. A method of hosting a side bet wagering event during a game of baccarat on an electronic gaming machine including a housing, player input control, video display including touchscreen sensitivity, processor, memory, and a value-in-value-out credit creation component selected from the group consisting of a) a ticket-in-ticket-out system having a ticket-reading imager and ticket printer, b) a currency validation system having a motor drive to advance currency past a scanner and c) a near field communication receiver and transmitter responsive to an external near field emitting element, the side bet wagering event in an underlying game of baccarat comprising:

- a player position committing credit through the player input controls on the side bet wagering event;
- upon the processor recognizing entry of a wager at a player position on the side bet wagering event, allowing the player position to create a pattern identifying at least three expected underlying baccarat game outcomes that include both player winning outcomes and banker winning outcomes in the pattern;
- the processor tracking the actual at least three underlying baccarat game outcomes after the player position has committed credit as a wager in the side bet wagering event;
- the processor resolving the side bet wager by comparing correspondence of the identified at least three expected underlying baccarat game outcomes and actual at least three underlying baccarat game outcomes and then resolving the side bet wager against a pay table identifying the correspondence, and crediting winning outcomes and decrementing credit in losing outcomes.

2. The method of claim 1 wherein a player enters a command through the player input controls to print a ticket from the ticket-in-ticket-out system to collect credit value stored in the memory of the electronic gaming machine.

3. The method of claim 2 wherein at least some odds in the pay table provide odds that are higher than statistical probabilities for the pattern.

4. The method of claim 1 wherein the pattern is created by a player moving a finger in contact with the touchscreen, or by a player selecting templates of patterns stored in memory on the processor.

5. The method of claim 4 wherein a pattern of adjacent columns for banker winning outcomes and player winning outcomes is provided on the touchscreen.

6. The method of claim 5 wherein the player contacts the screen within the pattern and drags horizontally to switch between player winning outcomes and banker winning outcomes, and up or down to alter numbers of player winning outcomes and banker winning outcomes within the pattern created by the player.

7. The method of claim 6 wherein at least some odds in the pay table provide odds that are higher than statistical probabilities for the pattern.

8. The method of claim 4 wherein at least some odds in the pay table provide odds that are higher than statistical probabilities for the pattern.

9. The method of claim 5 wherein at least some odds in the pay table provide odds that are higher than statistical probabilities for the pattern.

10. The method of claim 1 wherein occurrence of a tie outcome immediately ends further comparing or correspondence within a pattern.

11. The method of claim 1 wherein occurrence of a tie outcome is ignored in further comparing or correspondence within a pattern.

12. The method of claim 1 wherein occurrence of a tie is included in the creation of a pattern.

13. The method of claim 1 wherein at least some odds in the pay table provide odds that are higher than statistical probabilities for the pattern.

14. An electronic gaming machine comprising a housing, player input control, video display including touchscreen sensitivity, processor, memory, and a value-in-value-out credit creation component selected from the group consisting of a) a ticket-in-ticket-out system having a ticket-reading imager and ticket printer, b) a currency validation system having a motor drive to advance currency past a scanner and c) a near field communication receiver and transmitter responsive to an external near field emitting element, wherein the processor is configured to execute software to execute a process on the electronic gaming machine of:

- a player position committing credit through the player input controls on the side bet wagering event;
- upon the processor recognizing entry of a wager at a player position on the side bet wagering event, allowing the player position to create a pattern identifying at least three expected underlying baccarat game outcomes that include both player winning outcomes and banker winning outcomes in the pattern;
- the processor tracking the actual at least three underlying baccarat game outcomes after the player position has committed credit as a wager in the side bet wagering event;
- the processor resolving the side bet wager by comparing correspondence of the identified at least three expected underlying baccarat game outcomes and actual at least three underlying baccarat game outcomes and then resolving the side bet wager against a pay table identifying the correspondence and crediting winning outcomes and decrementing credit in losing outcomes.

15. A method of executing a side bet wagering event during a wagering event of baccarat on a gaming table including a playing surface on the gaming table, a processor, bet recognition system for determining presence and amount of wagers at a player position for the side bet, a playing card reading system that identifies at least value of playing cards during execution of play of the wagering event of baccarat, a player control panel including touchscreen functionality that communicates player input data to the processor, and a video display which indicates an ordered history of baccarat outcomes, wherein the side bet wagering event is executed against at least three consecutive outcomes occurring in an underlying game of baccarat comprising:

a player position commits credit to the side bet wager that is recognized by the bet recognition system;

upon the processor recognizing commitment of a wager at a player position on the side bet wagering event, allowing the player position to create on the player control panel a pattern identifying at least three expected underlying baccarat game outcomes that include both player winning outcomes and banker winning outcomes in the pattern;

the processor tracking the actual at least three underlying baccarat game outcomes after the player position has committed credit as a wager in the side bet wagering event;

the processor or a live dealer resolving the side bet wager by comparing correspondence of the identified at least three expected underlying baccarat game outcomes and actual at least three underlying baccarat game outcomes and then resolving the side bet wager against a pay table identifying levels of the correspondence, and crediting winning outcomes and decrementing credit in losing outcomes.

* * * * *